United States Patent
Yoshioka

(10) Patent No.: US 8,885,200 B2
(45) Date of Patent: Nov. 11, 2014

(54) IMAGE FORMING SYSTEM INCLUDING A FIRST IMAGE FORMING APPARATUS FOR CONTROLLING A SECOND IMAGE FORMING APPARATUS TO SHIFT INTO A SLEEP MODE

(71) Applicant: Taichi Yoshioka, Kanagawa (JP)

(72) Inventor: Taichi Yoshioka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/951,799

(22) Filed: Jul. 26, 2013

(65) Prior Publication Data

US 2014/0036308 A1 Feb. 6, 2014

(30) Foreign Application Priority Data

Aug. 6, 2012 (JP) ................................ 2012-174418

(51) Int. Cl.
*G06F 3/12* (2006.01)
*H04N 1/00* (2006.01)

(52) U.S. Cl.
CPC ......... *H04N 1/00888* (2013.01); *Y02B 60/1267* (2013.01); *G06F 3/1293* (2013.01)
USPC ......... 358/1.15; 358/1.9; 358/1.13; 358/1.14; 358/1.16; 358/1.18; 399/37; 399/88; 713/300; 713/310; 713/323; 713/324; 713/340

(58) Field of Classification Search
None
See application file for complete search history.

(56) References Cited

U.S. PATENT DOCUMENTS

| | | | | |
|---|---|---|---|---|
| 2007/0127057 A1* | 6/2007 | Bridges et al. | ............... | 358/1.15 |
| 2007/0146769 A1* | 6/2007 | Kato et al. | .................... | 358/1.14 |
| 2007/0171463 A1* | 7/2007 | Ishimura et al. | ............. | 358/1.15 |
| 2008/0174819 A1* | 7/2008 | Hada | ........................... | 358/1.15 |
| 2009/0161148 A1* | 6/2009 | Okada | ......................... | 358/1.15 |
| 2010/0014114 A1* | 1/2010 | Oosawa | ...................... | 358/1.15 |

FOREIGN PATENT DOCUMENTS

| | | |
|---|---|---|
| JP | 2005-169623 | 6/2005 |
| JP | 4481051 | 3/2010 |
| JP | 2010-137502 | 6/2010 |
| JP | 2011-065548 | 3/2011 |
| JP | 2011-243034 | 12/2011 |

* cited by examiner

*Primary Examiner* — Miya J Cato
(74) *Attorney, Agent, or Firm* — Oblon, Spivak, McClelland, Maier & Neustadt, L.L.P.

(57) ABSTRACT

A first image forming apparatus includes a first communication unit to communicate with a second image forming apparatus with a communication scheme without using a network; a monitoring unit to monitor a print job amount; a first control unit to, when the print job amount is not larger than a first threshold, perform control so that a first control signal for causing the second image forming apparatus to shift into a first mode is transmitted to the second image forming apparatus; and a second control unit to, when the second image forming apparatus is in the first mode and the print job amount for the first image forming apparatus is larger than a second threshold, perform control so that a second control signal for causing the second image forming apparatus to shift into a second mode is transmitted to the second image forming apparatus through the first communication unit.

12 Claims, 9 Drawing Sheets

FIG.10

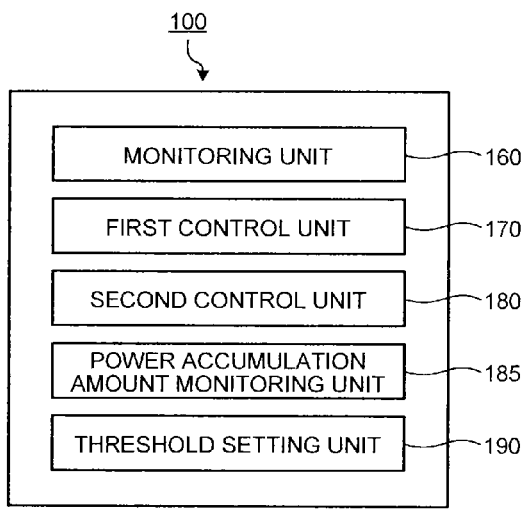

FIG.11

|  | POWER ACCUMULATION AMOUNT OF FIRST IMAGE FORMING APPARATUS 100 | POWER ACCUMULATION AMOUNT OF SECOND IMAGE FORMING APPARATUS 200 | SECOND THRESHOLD |
|---|---|---|---|
| PATTERN A | EQUAL TO OR LARGER THAN THIRD THRESHOLD | EQUAL TO OR LARGER THAN THIRD THRESHOLD | DECREASED |
| PATTERN B | EQUAL TO OR LARGER THAN THIRD THRESHOLD | SMALLER THAN THIRD THRESHOLD | UNCHANGED |
| PATTERN C | SMALLER THAN THIRD THRESHOLD | EQUAL TO OR LARGER THAN THIRD THRESHOLD | DECREASED |
| PATTERN D | SMALLER THAN THIRD THRESHOLD | SMALLER THAN THIRD THRESHOLD | UNCHANGED |

FIG.12

|  | POWER ACCUMULATION AMOUNT OF FIRST IMAGE FORMING APPARATUS 100 | POWER ACCUMULATION AMOUNT OF SECOND IMAGE FORMING APPARATUS 200 | SECOND THRESHOLD |
|---|---|---|---|
| PATTERN E | EQUAL TO OR LARGER THAN THIRD THRESHOLD | EQUAL TO OR LARGER THAN THIRD THRESHOLD | DECREASED |
| PATTERN F | EQUAL TO OR LARGER THAN THIRD THRESHOLD | SMALLER THAN THIRD THRESHOLD | INCREASED |
| PATTERN G | SMALLER THAN THIRD THRESHOLD | EQUAL TO OR LARGER THAN THIRD THRESHOLD | 0 |
| PATTERN H | SMALLER THAN THIRD THRESHOLD | SMALLER THAN THIRD THRESHOLD | UNCHANGED |

IMAGE FORMING SYSTEM INCLUDING A FIRST IMAGE FORMING APPARATUS FOR CONTROLLING A SECOND IMAGE FORMING APPARATUS TO SHIFT INTO A SLEEP MODE

CROSS-REFERENCE TO RELATED APPLICATIONS

The present application claims priority to and incorporates by reference the entire contents of Japanese Patent Application No. 2012-174418 filed in Japan on Aug. 6, 2012.

BACKGROUND OF THE INVENTION

1. Field of the Invention

The present invention relates to an image forming system and an image forming apparatus.

2. Description of the Related Art

In recent years, requirement for reduction in power consumption of a multifunction peripheral/laser printer (MFP/LP) apparatus is increased. For example, Japanese Patent No. 4481051 discloses the following configuration, in order to reduce power consumption of a plurality of image forming apparatuses connected to each other through a network. One image forming apparatus (an image forming apparatus operating as a master) receives print jobs of other image forming apparatuses and determines which image forming apparatus is to be used for printing, based on power consumption.

The technique disclosed in Japanese Patent No. 4481051 has the configuration in which the image forming apparatuses communicate with each other through the network. That is, other image forming apparatuses that wait for print jobs from the image forming apparatus operating as the master need to stand by in a state of being capable of responding to the network. In order to make the other image forming apparatuses be in the state of being capable of responding to the network, electric power needs to be supplied to a physical circuit, a logical layer circuit, a central processing unit (CPU), and the like of the network. This requires electric power of approximately 100 mW and the power consumption cannot be reduced sufficiently. Therefore, there is a need for an image forming system and an image forming apparatus that are capable of reducing power consumption further.

SUMMARY OF THE INVENTION

According to an embodiment, there is provided an image forming system that includes a first image forming apparatus and a second image forming apparatus that are capable of being connected to each other through a network. The second image forming apparatus includes a first communication unit, a second communication unit, and a first printing unit. The first communication unit is configured to communicate with the first image forming apparatus with a communication scheme that does not use the network and of which power consumption is smaller than power consumption of a communication scheme using the network. The second communication unit is configured to communicate with each of a host apparatus and the first image forming apparatus through the network. The first printing unit is configured to perform printing in accordance with a print job from the host apparatus. The first image forming apparatus includes a third communication unit, a fourth communication unit, a second printing unit, a monitoring unit, a first control unit, and a second control unit. The third communication unit is configured to communicate with the second image forming apparatus with a communication scheme that does not use the network and of which power consumption is smaller than power consumption of a communication scheme using the network. The fourth communication unit is configured to communicate with each of the host apparatus and the second image forming apparatus through the network. The second printing unit is configured to perform printing in accordance with the print job. The monitoring unit is configured to monitor a print job amount indicating an amount of the print job. The first control unit is configured to, when the print job amount monitored by the monitoring unit is equal to or smaller than a first threshold, perform control so that a first control signal is transmitted to the second image forming apparatus through the third communication unit or the fourth communication unit. The first control signal is a signal for causing the second image forming apparatus to shift into a first mode in which electric power is supplied to the first communication unit while stopping supply of electric power to each of the first printing unit and the second communication unit. The second control unit is configured to, when the second image forming apparatus is in the first mode and the print job amount for the first image forming apparatus is larger than a second threshold, perform control so that a second control signal is transmitted to the second image forming apparatus through the third communication unit. The second control signal is a signal for causing the second image forming apparatus to shift into a second mode in which electric power is supplied to each of the first printing unit and the second communication unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a functional block diagram illustrating a part of functions of a first image forming apparatus according to a third embodiment;

FIG. 11 is a table for explaining an example of patterns on which a threshold setting unit changes a second threshold; and FIG. 12 is a table for explaining another example of patterns on which the threshold setting unit changes the second threshold.

DETAILED DESCRIPTION OF THE PREFERRED EMBODIMENTS

Hereinafter, embodiments of an image forming system and an image forming apparatus according to the invention are described in detail with reference to the accompanying drawings. Although the following embodiments describe the image forming apparatus by taking a multifunction peripheral (MFP) having a printing function and a scanner function as an example, the image forming apparatus is not limited to the MFP. It is sufficient that the image forming apparatus has a function of forming an image on a recording medium (for example, paper). Note that the MFP is an apparatus having at least two functions of a printing function, a copying function, a scanning function, and a facsimile function.

First Embodiment

Figure 1:
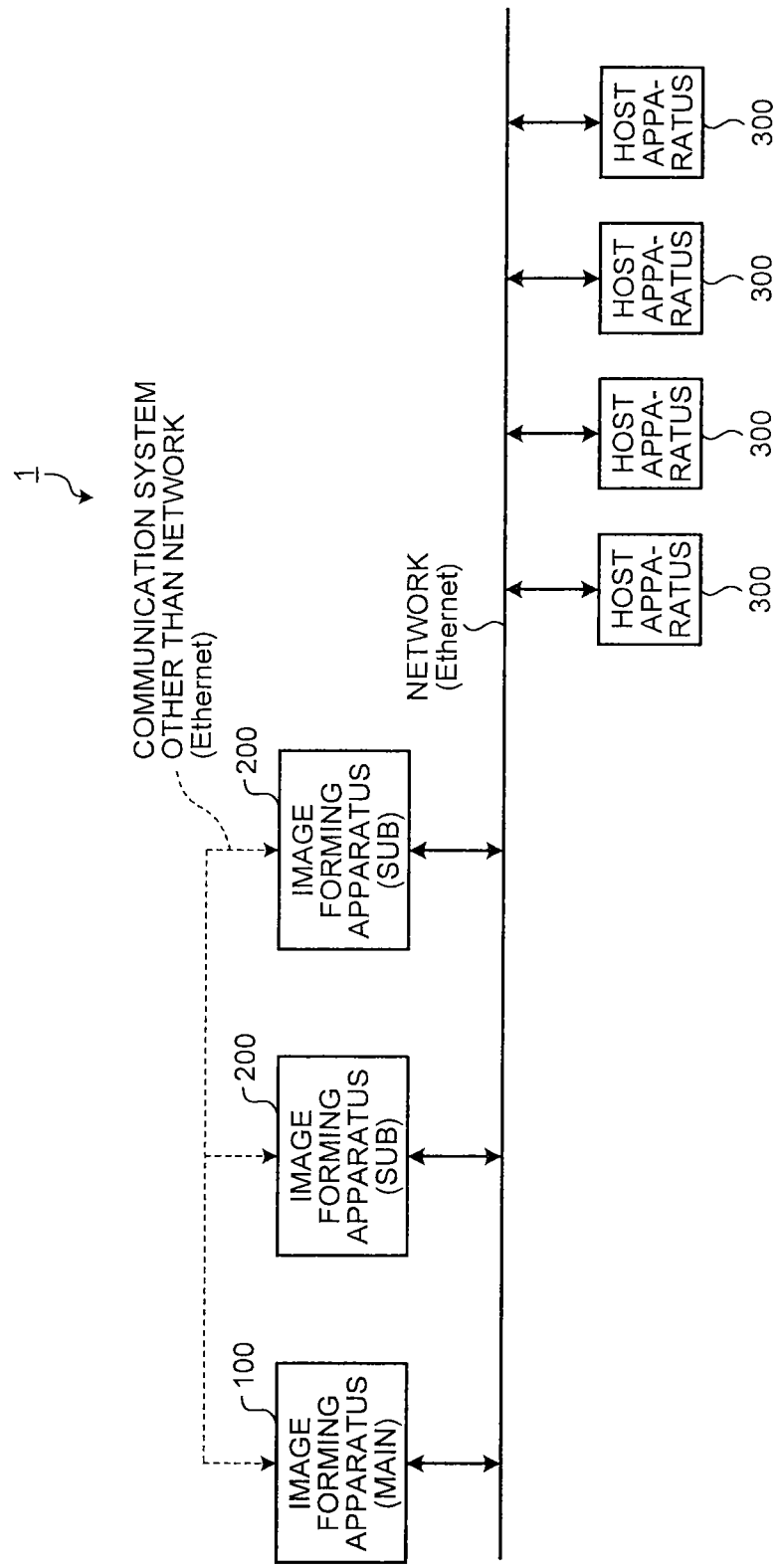
FIG. 1 is a diagram illustrating a configuration example of an image forming system according to a first embodiment.

FIG. 1 is a drawing illustrating a schematic configuration example of an image forming system 1 in a first embodiment. As illustrated in FIG. 1, the image forming system 1 includes a main image forming apparatus 100, sub image forming apparatuses 200, and host apparatuses 300 that are capable of being connected to each other through a network (Ethernet (registered trademark)). Although two sub image forming apparatuses 200 are included in the image forming system 1 and four host apparatuses 300 are included therein in the example of FIG. 1, their numbers are not limited to this example. Any number of sub image forming apparatuses 200 and host apparatuses 300 can be included in the image forming system 1 (it is sufficient that they are equal to or more than one). It is sufficient that the image forming system 1 includes the main image forming apparatus 100 and the sub image forming apparatus 200 that are capable of being connected to each other. For example, a part excluding the plurality of host apparatuses 300 (a part constituted by the main image forming apparatus 100 and the sub image forming apparatuses 200) in FIG. 1 can be also considered as the image forming system according to the invention.

The main image forming apparatus 100 and the respective sub image forming apparatuses 200 communicate with each other with a communication scheme other than the network (Ethernet). The following describes the detailed contents thereof. In the following explanations, the main image forming apparatus 100 is referred to as a "first image forming apparatus 100" and the sub image forming apparatus 200 is referred to as a "second image forming apparatus 200".

In the embodiment, the first image forming apparatus 100 and the second image forming apparatuses 200 have the same basic configuration. Note that the configurations of the first image forming apparatus 100 and the second image forming apparatuses 200 for providing the communication scheme other than the network (Ethernet) are different depending on the methods of providing the communication scheme other than the network (Ethernet) in some cases. Although the following describes the configuration of the first image forming apparatus 100 as an example, the configurations of the second image forming apparatuses 200 are the same as the configuration of the first image forming apparatus 100.

Figure 2:
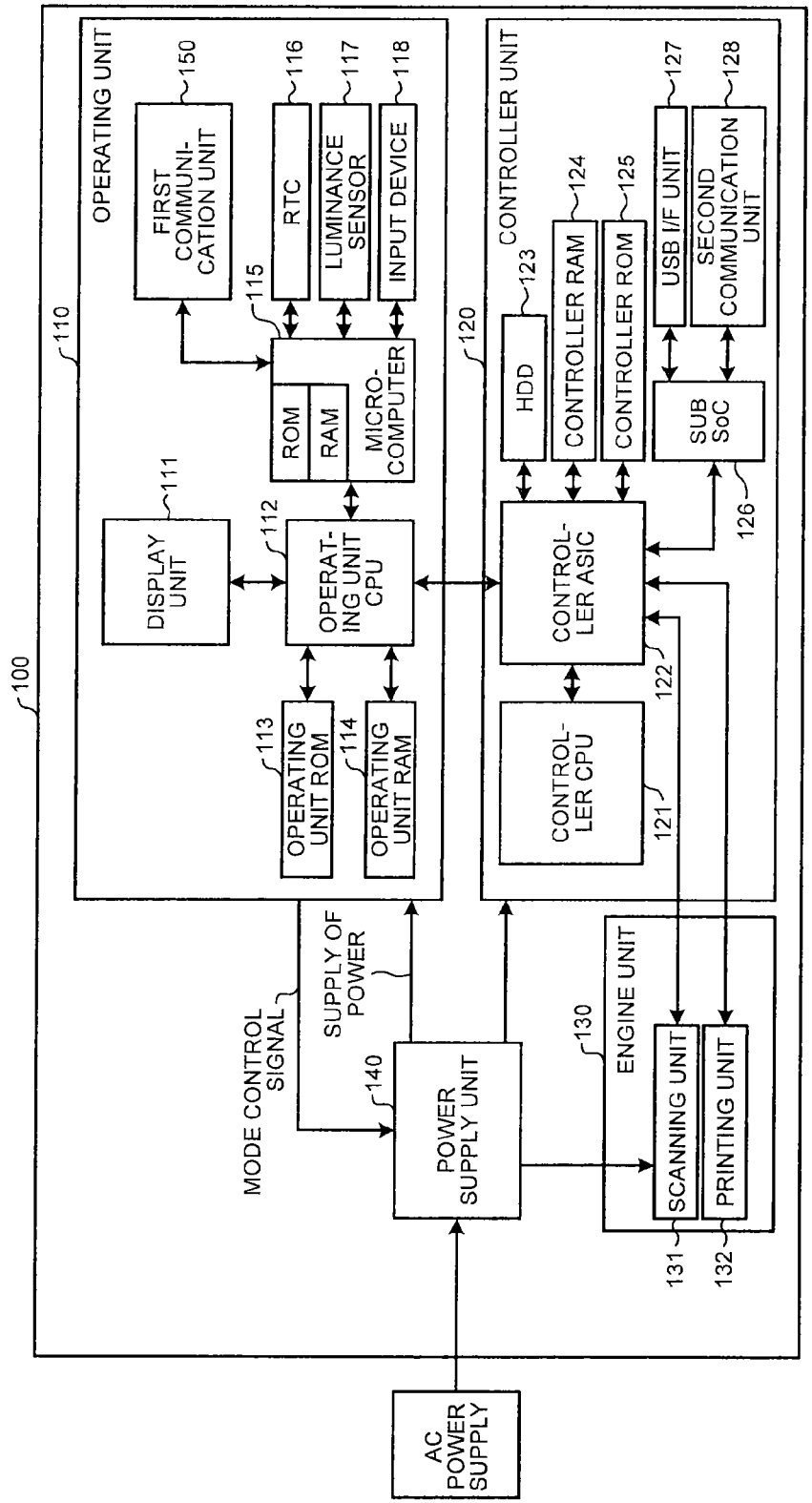
FIG. 2 is a block diagram illustrating a hardware configuration example of a first image forming apparatus in the first embodiment.

FIG. 2 is a block diagram illustrating a hardware configuration example of the first image forming apparatus 100. As illustrated in FIG. 2, the first image forming apparatus 100 includes an operating unit 110, a controller unit 120, an engine unit 130, and a power supply unit 140.

The operating unit 110 functions as a user I/F of the first image forming apparatus 100. As illustrated in FIG. 2, the operating unit 110 includes a display unit 111, an operating unit CPU 112, an operating unit read only memory (ROM) 113, an operating unit random access memory (RAM) 114, a microcomputer 115, a real-time clock (RTC) 116, a luminance sensor 117, and an input device 118. The display unit 111 displays various pieces of information relating to the first image forming apparatus 100 (for example, information indicating a state (mode) of the present first image forming apparatus 100 and information indicating processing states of jobs). The display unit 111 can be constituted by a liquid crystal display device, for example.

The operating unit CPU 112 controls the operating unit 110 overall. In this example, the operating unit CPU 112 reads programs stored in the operating unit ROM 113 and the like and loads and executes the programs on the operating unit RAM 114 so as to control the operating unit 110 overall.

The microcomputer 115 monitors inputs and the like with operations of the RTC 116, the luminance sensor 117, and the input device 118 so as to control a shift to and recovery from energy saving, and so on. Although the following describes the detailed contents, the microcomputer 115 transmits mode control signals for shifting the state (mode) of the first image forming apparatus 100 to the power supply unit 140 if various types of conditions are satisfied. Furthermore, the microcomputer 115 is constituted as a computer device including a CPU, a ROM, a RAM, and the like. The CPU reads the programs stored in the ROM and the like and loads and executes the programs on the RAM so as to execute various types of functions. Various types of functions of the microcomputer 115 will be described in detail later.

The RTC 116 counts the time. The luminance sensor 117 detects luminance (brightness) of environment. The RTC 116 and the luminance sensor 117 can have various well-known configurations. The input device 118 is used for receiving various types of user's inputs and can be constituted by a hard key, for example.

As will be described later, electric power is constantly supplied to the microcomputer 115 in the embodiment. Furthermore, the first communication unit 150 is connected to the microcomputer 115. The first communication unit 150 is a device communicating with each of the second image forming apparatuses 200 with a communication scheme that does not use the network (Ethernet) and of which power consumption is smaller than that of the communication scheme using the network. Herein, the first communication unit 150 included in the first image forming apparatus 100 corresponds to a "third communication unit" in claims, and the first communication unit 150 included in each second image forming apparatus 200 corresponds to a "first communication unit" in claims. In the embodiment, the first communication unit 150 transmits and receives a mode shift instruction to shift into a shutdown mode, which will be described later, information for notifying of the apparatus state, and the like to and from the second image forming apparatuses 200 only. Therefore, the first communication unit 150 does not require to have higher speed and larger bandwidth. This means that a device with reduced power consumption and low cost can be used as the first communication unit 150.

The first communication unit 150 may be a device that makes communication with wires, for example. In this case, the image forming apparatuses can be connected with wired cables and make serial communication with a universal asynchronous receiver transmitter (UART) or the like so as to transmit and receive information to and from each other. In the case of the wired communication, if the plurality of second image forming apparatuses 200 are tried to be connected to one first image forming apparatus 100 in a star form, the wired cables for the number of second image forming apparatuses 200 are required to be connected to the first image forming apparatus 100. In order to prevent this, it is preferable that the plurality of second image forming apparatuses 200 be connected to the first image forming apparatus 100 in a daisy chain form rather than in the star form.

The first communication unit 150 may be a device that makes communication using infrared rays (light), for example. In this case, the first communication unit 150 is capable of communicating with the second image forming apparatuses 200 with the Infrared Data Association (IrDA) that is implemented in mobile phones generally, infrared communication that is used for remote controls of home electronics, or the like.

The first communication unit 150 may be a device that makes communication using the ZigBee or the BlueTooth (registered trademark). In this case, although the communication speed and the communication distance are inferior to those of WiFi and the like, the power consumption is significantly reduced and the first communication unit 150 is capable of being driven with a battery. In addition, the first communication unit 150 is capable of making communication on an area of approximately one floor of an office, thereby reducing constraints relating to an installation place of the image forming apparatus.

Described next is the controller unit 120. The controller unit 120 controls the first image forming apparatus 100 overall. The controller unit 120 includes a controller CPU 121, a controller ASIC 122, an hard disk drive (HDD) 123, a controller RAM 124, a controller ROM 125, a sub SoC 126, a USB I/F unit 127, and a second communication unit 128. The controller CPU 121 performs drawing processing of print data contained in print jobs transmitted from the host apparatuses 300, and the like. The controller CPU 121 reads programs stored in the controller ROM 125 and the like and loads and executes the programs on the controller RAM 124 so as to control the first image forming apparatus 100 overall.

The controller ASIC 122 performs pieces of processing such as contraction and expansion, rotation, and edition on an image transmitted from a scanning unit, which will be described later, and controls the controller RAM 124 and the HDD 123. The HDD 123 accumulates image data, backs-up the image data for jam, and accumulates device data. The controller RAM 124 functions as work memories of the controller CPU 121 and the controller ASIC 122. The controller ROM 125 is a non-volatile memory for storing programs and data that are executed by the controller CPU 121.

The sub SoC 126 performs input/output (I/O) control of the USB I/F unit 127 and the second communication unit 128. In a controller OFF mode, which will be described later, the sub SoC 126 monitors the network and responds to packets through the Ethernet and the like. Note that the controller CPU 121 and the controller ASIC 122 are powered OFF in the controller OFF mode.

The USB I/F unit 127 is an interface for connecting the host apparatuses 300 and the first image forming apparatus 100. The second communication unit 128 is a device that communicates with each of the host apparatuses 300 and each of the second image forming apparatuses through the network (Ethernet). The second communication unit 128 receives print jobs and the like from the host apparatuses 300. The controller CPU 121 controls the first image forming apparatus 100 so as to execute printing in accordance with the print job received by the second communication unit 128. The second communication unit 128 included in the first image forming apparatus 100 corresponds to a "fourth communication unit" in claims and the second communication unit 128 included in each second image forming apparatus 200 corresponds to a "second communication unit" in claims.

Described next is the engine unit 130. The engine unit 130 reads and prints documents, and so on. The engine unit 130 includes a scanning unit 131 and a printing unit 132. The scanning unit 131 reads the document as RGB digital image data with a charge-coupled device (CCD) or the like and performs pieces of image processing such as shading correction, background removal, and constant value coding. The printing unit 132 prints an image processed by the scanning unit 131 and the controller unit 120. It can be considered that the printing unit 132 has a function of performing printing in accordance with the print jobs from the host apparatuses 300.

The power supply unit 140 has a function of converting an alternating current (AC) power from an AC power supply to a direct current power that can be used in the first image forming apparatus 100 and supplying the converted direct current power to the respective parts (the operating unit 110, the controller unit 120, the engine unit 130, and the like) of the first image forming apparatus 100.

Figure 3:
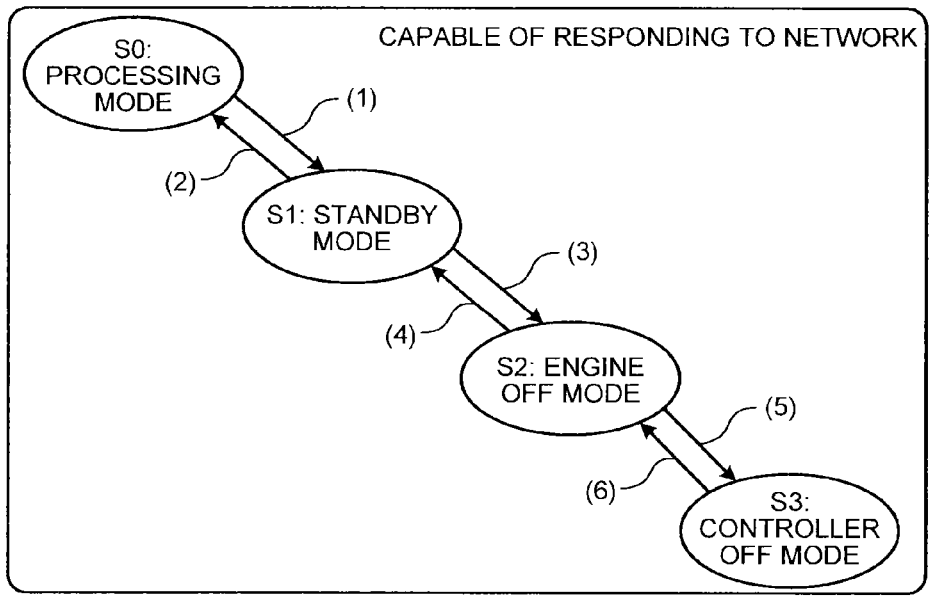
FIG. 3 is a schematic plan view for explaining a mode shift of the first image forming apparatus.

FIG. 3 is a schematic plan view for explaining a state (mode) shift of the first image forming apparatus 100. As illustrated in FIG. 3, there are four types of modes including a processing mode S0, a standby mode S1, an engine OFF mode S2, and a controller OFF mode S3 as modes of the first image forming apparatus 100. The processing mode S0 indicates a state where processing by the engine unit 130 is being performed (for example, a state where printing is being performed). The standby mode S1 indicates a state where electric power is supplied to the respective parts (the operating unit 110, the controller unit 120, the engine unit 130, and the like) of the first image forming apparatus 100 and the engine unit 130 is ready for executing the processing. The engine OFF mode S2 indicates a state where supply of electric power to the engine unit 130 is stopped. The power consumption in the engine OFF mode S2 is smaller than the power consumption in the standby mode S1. The controller OFF mode S3 indicates a state where supply of electric power to the engine unit 130 and the elements other than the sub SoC 126, the USB I/F unit 127 and the second communication unit 128 among the elements constituting the controller unit 120 is stopped. In the controller OFF mode S3, the first image forming apparatus 100 is capable of responding to the network. The magnitudes of the power consumption in the respective modes satisfy S0>S1>S2>S3.

Next, conditions for shifting between the respective modes will be described. A condition (1) in which the first image forming apparatus 100 is shifted into the standby mode S1 from the processing mode S0 includes termination of a print job (termination of the printing by the engine unit 130), for example. A condition (2) in which the first image forming apparatus 100 is shifted into the processing mode S0 from the standby mode S1 includes start of processing of a print job (start of the printing by the engine unit 130), for example.

A condition (3) in which the first image forming apparatus 100 is shifted into the engine OFF mode S2 from the standby mode S1 includes reception, by the above-mentioned microcomputer 115, of an input of selecting (specifying) the engine OFF mode S2 with an operation on the input device 118 by a user, and reception, from a timer (not illustrated), of information indicating that the time has come to shift the first image forming apparatus 100 into the engine OFF mode S2, for example. If the condition (3) has been satisfied, in which the first image forming apparatus 100 is shifted into the engine OFF mode S2 from the standby mode S1, the microcomputer 115 transmits, to the power supply unit 140, a mode control signal for causing the first image forming apparatus 100 to shift into the engine OFF mode S2 from the standby mode S1. The power supply unit 140 that has received the mode control signal supplies electric power to the operating unit 110 and the controller unit 120 while stopping supply of electric power to the engine unit 130.

Furthermore, a condition (4) in which the first image forming apparatus 100 is shifted into the standby mode S1 from the engine OFF mode S2 includes detection of a recovery factor (opening/closing of a pressurizing plate, set of a document on a document feeder (DF), reception of a print job from the host apparatus 300, and the like) by the microcomputer 115, for example. If the condition (4) has been satisfied, in which the first image forming apparatus 100 is shifted into the standby mode S1 from the engine OFF mode S2, the microcomputer 115 transmits, to the power supply unit 14, a mode control signal for causing the first image forming apparatus 100 to shift into the standby mode S1 from the engine OFF mode S20. The power supply unit 140 that has received the mode control signal restarts supply of electric power to the engine unit 130. In other words, the power supply unit 140 supplies electric power to the operating unit 110, the controller unit 120, and the engine unit 130.

A condition (5) in which the first image forming apparatus 100 is shifted into the controller OFF mode S3 from the engine OFF mode S2 includes reception, from the timer (not illustrated), of information indicating that the time has come to shift the first image forming apparatus 100 into the controller OFF mode S3, for example. If the condition (5) has been satisfied, in which the first image forming apparatus 100 is shifted into the controller OFF mode S3 from the engine OFF mode S2, the microcomputer 115 transmits, to the power supply unit 140, a mode control signal for causing the first image forming apparatus 100 to shift into the controller OFF mode S3 from the engine OFF mode S2. The power supply unit 140 that has received the mode control signal supplies electric power to each of at least the operating unit 110, the sub SoC 126, the USB I/F unit 127 and the second communication unit 128 while stopping supply of electric power to the engine unit 130 and the elements other than the sub SoC 126, the USB I/F unit 127 and the second communication unit 128 among the elements constituting and the controller unit 120.

A condition (6) in which the first image forming apparatus 100 is shifted into the engine OFF mode S2 from the controller OFF mode S3 includes detection of a recovery factor (opening/closing of the pressurizing plate, set of a document on the DF, reception of a print job from the host apparatus 300, and the like) by the microcomputer 115, for example. If the condition (6) has been satisfied, in which the first image forming apparatus 100 is shifted into the engine OFF mode S2 from the controller OFF mode S3, the microcomputer 115 transmits, to the power supply unit 140, a mode control signal for causing the first image forming apparatus 100 to shift into the engine OFF mode S2 from the controller OFF mode S3. The power supply unit 140 that has received the mode control signal restarts supply of electric power to the elements other than the sub SoC 126, the USB I/F unit 127 and the second communication unit 128 among the elements constituting the controller unit 120. In other words, the power supply unit 140 supplies electric power to the operating unit 110 and the controller unit 120 while stopping supply of electric power to the engine unit 130.

Figure 4:
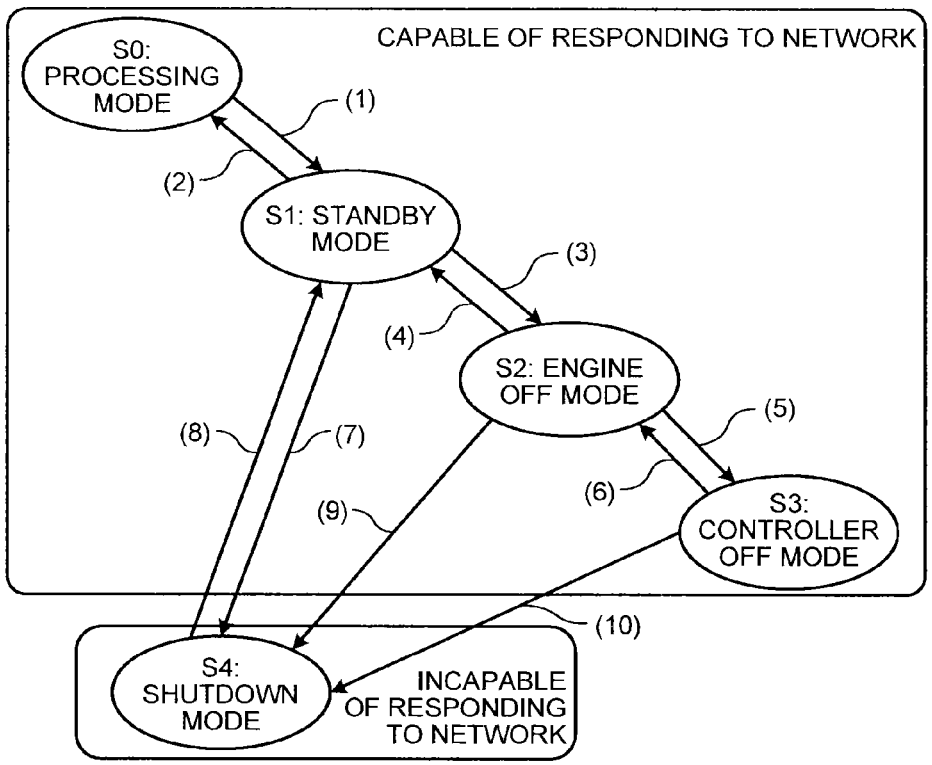
FIG. 4 is a schematic plan view for explaining the mode shift of a second image forming apparatus.

FIG. 4 is a schematic plan view for explaining the mode shift of each second image forming apparatus 200. As illustrated in FIG. 4, modes of the second image forming apparatus 200 include a shutdown mode S4 in addition to the processing mode S0, the standby mode S1, the engine OFF mode S2, and the controller OFF mode S3 as described above. The shutdown mode S4 indicates a state where electric power is supplied to each of the microcomputer 115, the RTC 116, the luminance sensor 117, the input device 118, and the first communication unit 150 among the respective elements constituting the second image forming apparatus 200 while supply of electric power to the other elements is stopped.

Furthermore, in the embodiment, supply of electric power to the first communication unit 150 is stopped when the second image forming apparatus 200 is in the processing mode S0, the standby mode S1, the engine OFF mode S2 and the controller OFF mode S3 (that is, modes other than the shutdown mode S4).

Then, conditions for shifting between the respective modes will be described. Description of overlapped portions with the conditions for shifting between the respective modes on the first image forming apparatus 100 is omitted. A condition (7) in which the second image forming apparatus 200 is shifted into the shutdown mode S4 from the standby mode S1 includes determination, by the microcomputer 115, that the luminance detected by the luminance sensor 117 is lower than a threshold, reception, by the microcomputer 115, of an input of selecting (specifying) the shutdown mode S4, reception, from a timer (not illustrated), of information indicating that the time has come to shift the second image forming apparatus 200 into the shutdown mode S4, and detection of reception of a first control signal (which will be described later) from the first image forming apparatus 100 through the second communication unit 128. If the condition (7) has been satisfied, in which the second image forming apparatus 200 is shifted into the shutdown mode S4 from the standby mode S1, the microcomputer 115 transmits, to the power supply unit 140, a mode control signal for causing the second image forming apparatus 200 to shift into the shutdown mode S4 from the standby mode S1. The power supply unit 140 that has received the mode control signal supplies electric power to each of the microcomputer 115, the RTC 116, the luminance sensor 117, the input device 118, and the first communication unit 150 among the elements constituting the second image forming apparatus 200 while stopping supply of electric power to the other elements.

A condition (8) in which the second image forming apparatus 200 is shifted into the standby mode S1 from the shutdown mode S4 includes determination, by the microcomputer 115, that the luminance detected by the luminance sensor 117 is equal to or higher than the threshold, reception, by the microcomputer 115, of an input of selecting the standby mode S1, reception, from the timer (not illustrated), of information indicating that the time has come to shift the second image forming apparatus 200 into the standby mode S1, and detection of reception of a second control signal (which will be described later) from the first image forming apparatus 100 through the first communication unit 150. If the condition (8) has been satisfied, in which the second image forming apparatus 200 is shifted into the standby mode S1 from the shutdown mode S4, the microcomputer 115 transmits, to the power supply unit 140, a mode control signal for causing the second image forming apparatus 200 to shift into the standby mode S1 from the shutdown mode S4. The power supply unit 140 that has received the mode control signal supplies electric power to each of at least the operating unit 110, the controller unit 120, and the engine unit 130 while stopping supply of electric power to the first communication unit 150.

A condition (9) in which the second image forming apparatus 200 is shifted into the shutdown mode S4 from the engine OFF mode S2 includes determination, by the microcomputer 115, that the luminance detected by the luminance sensor 117 is lower than the threshold, and reception, from the timer (not illustrated), of information indicating that the time has come to shift the second image forming apparatus 200 into the shutdown mode S4. If the condition (9) has been satisfied, in which the second image forming apparatus 200 is shifted into the shutdown mode S4 from the engine OFF mode S2, the microcomputer 115 transmits, to the power supply unit 140, a mode control signal for causing the second image forming apparatus 200 to shift into the shutdown mode S4 from the engine OFF mode S2. The power supply unit 140 that has received the mode control signal supplies electric power to each of the microcomputer 115, the RTC 116, the luminance sensor 117, the input device 118, and the first communication unit 150 of the operating unit 110 among the elements constituting the second image forming apparatus 200 while stopping supply of electric power to the other elements.

A condition (10) in which the second image forming apparatus 200 is shifted into the shutdown mode S4 from the controller OFF mode S3 includes determination, by the microcomputer 115, that the luminance detected by the luminance sensor 117 is lower than the threshold, and reception, from the timer (not illustrated), of information indicating that the time has come to shift the second image forming apparatus 200 into the shutdown mode S4. If the condition (10) has been satisfied, in which the second image forming apparatus 200 is shifted into the shutdown mode S4 from the controller OFF mode S3, the microcomputer 115 transmits, to the power supply unit 140, a mode control signal for causing the second image forming apparatus 200 to shift into the shutdown mode S4 from the controller OFF mode S3. The power supply unit 140 that has received the mode control signal supplies electric power to each of the microcomputer 115, the RTC 116, the luminance sensor 117, the input device 118, and the first communication unit 150 of the operating unit 110 among the elements constituting the second image forming apparatus 200 while stopping supply of electric power to the other elements.

As is understood from the above-mentioned explanation, electric power is constantly supplied to the microcomputers 115 in any of the modes of the first image forming apparatus 100 and the second image forming apparatuses 200.

Although the modes of the first image forming apparatus 100 do not include the shutdown mode S4 in the embodiment, the embodiment is not limited thereto. For example, the modes of the first image forming apparatus 100 may include the shutdown mode S4. The shutdown mode S4 of the first image forming apparatus 100 may be a state where electric power is supplied to each of the microcomputer 115, the RTC 116, the luminance sensor 117, the input device 118, and the first communication unit 150 among the elements constituting the first image forming apparatus 100 while supply of electric power to the other elements is stopped in the same manner as the shutdown mode S4 of the second image forming apparatus 200. Alternatively, the shutdown mode S4 of the first image forming apparatus 100 may be, for example, a state where electric power is supplied to each of the microcomputer 115, the RTC 116, the luminance sensor 117, and the input device 118 among the elements constituting the first image forming apparatus 100 while supply of electric power to the other elements (including the first communication unit 150) is stopped. In this example, while the shutdown mode S4 of the first image forming apparatus 100 indicates the state where electric power is supplied to each of the microcomputer 115, the RTC 116, the luminance sensor 117, and the input device 118 among the elements constituting the first image forming apparatus 100, supply of electric power to the other elements (including the first communication unit 150) is stopped.

Figure 5:
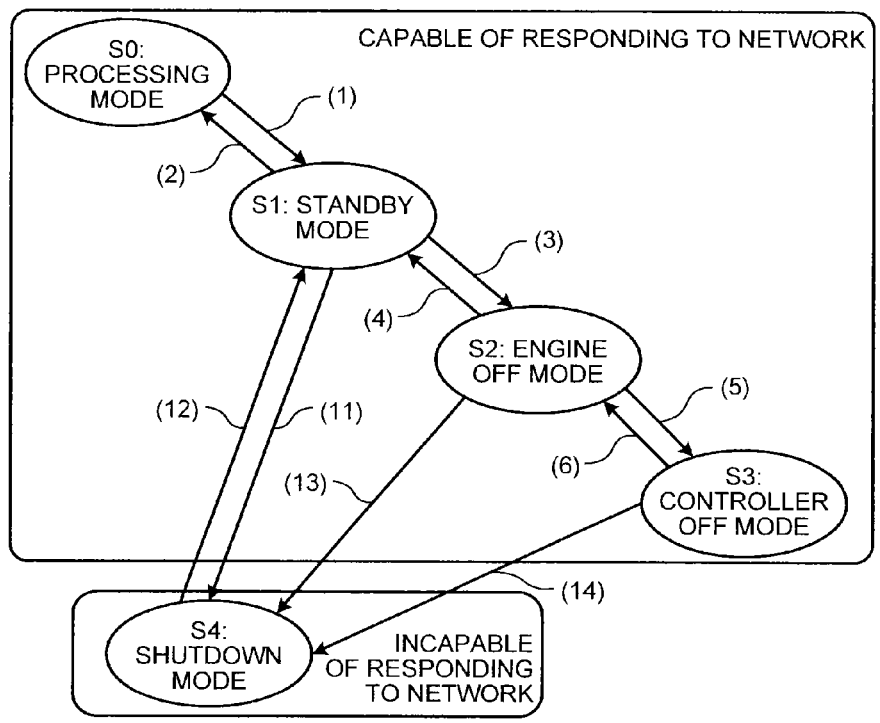
FIG. 5 is a schematic plan view for explaining a modification of the mode shift of the first image forming apparatus.

FIG. 5 is a plan view for explaining the mode shift of the first image forming apparatus 100 in this case. As illustrated in FIG. 5, the modes of the first image forming apparatus 100 include the shutdown mode S4 in addition to the processing mode S0, the standby mode S1, the engine OFF mode S2, and the controller OFF mode S3 as described above. The following describes the conditions for shifting between the respective modes. Description of overlapped portions with those in the above-mentioned embodiment is omitted. A condition (11) in which the first image forming apparatus 100 is shifted into the shutdown mode S4 from the standby mode S1 includes reception, from the timer (not illustrated), of information indicating that the time has come (for example, time late at night) to shift the first image forming apparatus 100 into the shutdown mode S4. If the condition (11) has been satisfied, in which the first image forming apparatus 100 is shifted into the shutdown mode S4 from the standby mode S1, the microcomputer 115 transmits, to the power supply unit 140, a mode control signal for causing the first image forming apparatus 100 to shift into the shutdown mode S4 from the standby mode S1. The power supply unit 140 that has received the mode control signal supplies electric power to each of the microcomputer 115, the RTC 116, the luminance sensor 117, and the input device 118 among the elements constituting the first image forming apparatus 100 while stopping supply of electric power to the other elements (including the first communication unit 150).

A condition (12) in which the first image forming apparatus 100 is shifted into the standby mode S1 from the shutdown mode S4 includes reception, from the timer (not illustrated), of information indicating that the time has come (for example, time in early morning) to shift the first image forming apparatus 100 into the standby mode S1. If the condition (12) has been satisfied, in which the first image forming apparatus 100 is shifted into the standby mode S1 from the shutdown mode S4, the microcomputer 115 transmits a mode control signal for causing the first image forming apparatus 100 to shift into the standby mode S1 from the shutdown mode S4 to the power supply unit 140. The power supply unit 140 that has received the mode control signal supplies electric power to each of at least the operating unit 110, the controller unit 120, and the engine unit 130 while stopping supply of electric power to the first communication unit 150.

A condition (13) in which the first image forming apparatus 100 is shifted into the shutdown mode S4 from the engine OFF mode S2 includes reception, from the timer (not illustrated), of information indicating that the time has come to shift the first image forming apparatus 100 into the shutdown mode S4. If the condition (13) has been satisfied, in which the first image forming apparatus 100 is shifted into the shutdown mode S4 from the engine OFF mode S2, the microcomputer 115 transmits, to the power supply unit 140, a mode control signal for causing the first image forming apparatus 100 to shift into the shutdown mode S4 from the engine OFF mode S2. The power supply unit 140 that has received the mode control signal supplies electric power to each of the microcomputer 115, the RTC 116, the luminance sensor 117, and the input device 118 of the operating unit 110 among the elements constituting the first image forming apparatus 100 while stopping supply of electric power to the other elements (including the first communication unit 150).

A condition (14) in which the first image forming apparatus 100 is shifted into the shutdown mode S4 from the controller OFF mode S3 includes reception, from the timer (not illustrated), of information indicating that the time has come to shift the first image forming apparatus 100 into the shutdown mode S4. If the condition (14) has been satisfied, in which the first image forming apparatus 100 is shifted into the shutdown mode S4 from the controller OFF mode S3, the microcomputer 115 transmits, to the power supply unit 140, a mode control signal for causing the first image forming apparatus 100 to shift into the shutdown mode S4 from the controller OFF mode S3. The power supply unit 140 that has received the mode control signal supplies electric power to each of the microcomputer 115, the RTC 116, the luminance sensor 117, and the input device 118 of the operating unit 110 among the elements constituting the first image forming apparatus 100 while stopping supply of electric power to the other elements (including the first communication unit 150).

Figure 6:
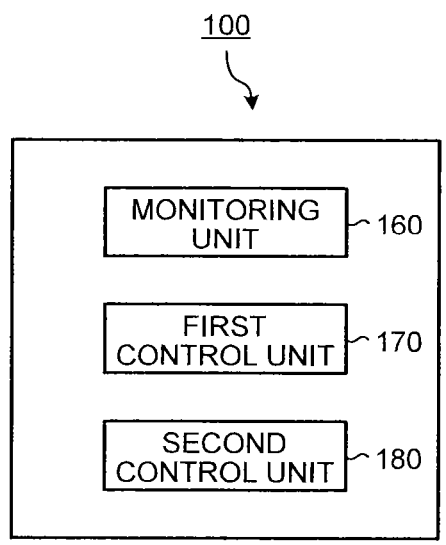
FIG. 6 is a functional block diagram illustrating a part of functions of the first image forming apparatus in the first embodiment.

FIG. 6 is a block diagram illustrating a part of the functions of the first image forming apparatus 100. As illustrated in FIG. 6, the first image forming apparatus 100 includes a monitoring unit 160, a first control unit 170, and a second control unit 180. In this example, although the respective functions of the monitoring unit 160, the first control unit 170, and the second control unit 180 are executed if the microcomputer 115 executes the programs stored in the ROM and the like, the embodiment is not limited thereto. For example, at least a part of the functions of the monitoring unit 160, the first control unit 170, and the second control unit 180 may be executed on a dedicated hardware circuit.

The monitoring unit 160 monitors a print job amount indicating an amount of the print job from the respective host apparatuses 300. The print job amount that is monitored by the monitoring unit 160 is not limited to a measured value and may be an expected value. Although the monitoring unit 160 acquires the print jobs that are transmitted to the first image forming apparatus 100 and the second image forming apparatuses 200 from the respective host apparatuses 300 so as to monitor the print job amount in the embodiment, the embodiment is not limited thereto. Any desired method can be used for monitoring the print job amount. For example, considered is a method in which the monitoring unit 160 transmits a specific packet to the host apparatuses 300 and grasps the number of operating host apparatuses 300 based on response states thereto so as to calculate the expected value of the print job amount in accordance with the number of operating host apparatuses 300. In addition, also considered is a method in which statistics of daily usage states of the host apparatuses 300 are taken and time periods during which the host apparatuses 300 are used frequently and time periods during which the host apparatuses 300 are not used so much are obtained so as to calculate the expected value of the print job amount in accordance with a time period to which the present time belongs. Furthermore, also considered is a method in which an office management system notifies the monitoring unit 160 of the number of people present in the room and the monitoring unit 160 compares the notified number of people and the predetermined number of people so as to calculate the expected value of the print job amount in accordance with the comparison result.

When the print job amount monitored by the monitoring unit 160 is equal to or smaller than a first threshold, the first control unit 170 performs control so that a first control signal is transmitted to the second image forming apparatuses 200 through the first communication unit 150 (corresponding to the "third communication unit" in claims) or the second communication unit 128 (corresponding to the "fourth communication unit" in claims). The first control signal is a signal for causing the second image forming apparatuses 200 to shift into the shutdown mode S4 (corresponding to a "first mode" in claims) in which electric power is supplied to the first communication units 150 while stopping supply of electric power to each of the printing units 132 and the second communication units 128. As described above, in the embodiment, supply of electric power to the first communication unit 150 is stopped when each second image forming apparatus 200 is in the modes other than the shutdown mode S4. Based on this, the first control unit 170 performs control so that the above-mentioned first control signal is transmitted to the second image forming apparatuses 200 through the second communication unit 128 (that is, through a network).

The embodiment is not limited to the above-described configuration. For example, if employed is a mode in which electric power is supplied to the first communication units 150 even when the second image forming apparatuses 200 are in the modes other than the shutdown mode S4, the first control unit 170 may perform control so that the above-mentioned first control signal is transmitted to the second image forming apparatuses 200 through the first communication unit 150. Note that the mode in which supply of electric power to the first communication unit 150 is stopped when the second image forming apparatuses 200 are in the modes other than the shutdown mode S4 as in the embodiment has an advantage that wasteful power consumption can be reduced in comparison with the mode in which supply of electric power to the first communication unit 150 is sustained even when the second image forming apparatuses 200 are in the modes other than the shutdown mode S4.

Although the first control unit 170 transmits the first control signal to the second image forming apparatuses 200 when the print job amount monitored by the monitoring unit 160 is equal to or smaller than the first threshold in the embodiment, this is an example and the embodiment is not limited to this example. For example, the following may be employed. That is, when the first threshold is set individually for each of the plurality of second image forming apparatuses 200 and the print job amount monitored by the monitoring unit 160 is equal to or smaller than the first threshold corresponding to one second image forming apparatus 200, the first control unit 170 may transmit the first control signal to the corresponding second image forming apparatus 200.

When the second image forming apparatuses 200 are in the shutdown mode S4 (corresponding to the "first mode" in claims) and the print job amount for the first image forming apparatus 100 is larger than a second threshold, the second control unit 180 performs control so that a second control signal is transmitted to the second image forming apparatuses 200 in the shutdown mode S4 through the first communication unit 150 (corresponding to the "third communication unit" in claims). The second control signal is a signal for causing the second image forming apparatuses 200 to shift into the standby mode S1 (corresponding to a "second mode" in claims) in which electric power is supplied to each of at least the printing units 132 and the second communication units 128.

Furthermore, the second control unit 180 performs control so that at least a part of the print job amount for the first image forming apparatus 100 is assigned to the second image forming apparatuses 200 to which the second control signal is transmitted. In the embodiment, after the second image forming apparatuses 200 to which the second control signal has been transmitted have been shifted into the standby mode S1, the second control unit 180 performs control so that a part of the print job amount for the first image forming apparatus 100 is assigned to the second image forming apparatuses 200 through the second communication unit 128 (through the network). The embodiment is not limited thereto. For example, if electric power is supplied to the first communication units 150 even when the second image forming apparatuses 200 are in the modes other than the shutdown mode S4, the second control unit 180 may perform control so that a part of the print job amount for the first image forming apparatus 100 is assigned to the second image forming apparatuses 200 through the first communication unit 150.

The second image forming apparatuses 200 in the shutdown mode S4 are incapable of responding to the network, so that they are not seen from the host apparatuses 300. For this reason, the print jobs from the host apparatuses 300 are received and processed by the image forming apparatus being capable of responding to the network. For example, if a printer driver installed on each host apparatus 300 selects the image forming apparatus capable of responding to the network and transmits the job to it, a user is not required to be aware of the states of the image forming apparatuses. Alternatively, the user can select an image forming apparatus that is incapable of responding to the network and a mode in which the job can be transmitted to the image forming apparatus can be prepared. In this case, after the main first image forming apparatus 100 has received the job, the first image forming apparatus 100 transmits the above-mentioned second control signal to the second image forming apparatus 200 selected by the user. With this, the first image forming apparatus 100 is capable of activating the second image forming apparatus 200 and assigning the received job to it. This enables the user to select the second image forming apparatus 200 that is incapable of responding to the network so as to perform printing.

Figure 7:
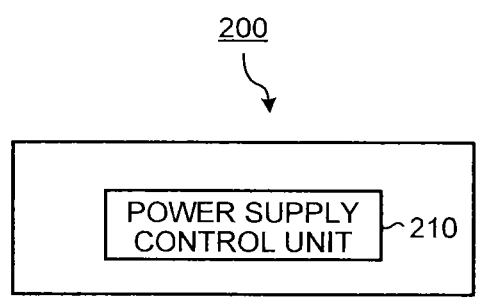
FIG. 7 is a functional block diagram illustrating a part of functions of the second image forming apparatus in the first embodiment.

FIG. 7 is a block diagram illustrating a part of the functions of each second image forming apparatus 200. As illustrated in FIG. 7, each second image forming apparatus 200 includes a power supply control unit 210. Although the functions of the power supply control unit 210 are executed when the microcomputer 115 executes the programs stored in the ROM and the like in this example, the embodiment is not limited thereto. For example, the functions of the power supply control unit 210 may be executed on a dedicated hardware circuit.

In the second image forming apparatus 200, the first communication unit 150 has received the second control signal from the first image forming apparatus 100 (second control unit 180), the power supply control unit 210 performs control so that electric power is supplied to each of the printing unit 132 and the second communication unit 128 while stopping supply of electric power to the first communication unit 150. To be more specific, the power supply control unit 210 transmits, to the power supply unit 140, the mode control signal for causing the second image forming apparatus 200 to shift into the standby mode S1 from the shutdown mode S4. The power supply unit 140 that has received the mode control signal supplies electric power to at least the operating unit 110, the controller unit 120, and the engine unit 130 while stopping supply of electric power to the first communication unit 150. If the shift into the standby mode S1 is completed, the power supply control unit 210 performs control so that a signal indicating the completion of the shift into the standby mode S1 is transmitted to the first image forming apparatus 100 (microcomputer 115) through the second communication unit 128 as a response to the second control signal.

In the second image forming apparatus 200, the second communication unit 128 has received the first control signal from the first image forming apparatus 100 (first control unit 170), the power supply control unit 210 performs control so that supply of electric power to each of the printing unit 132 and the second communication unit 128 is stopped while supplying electric power to the first communication unit 150. To be more specific, the power supply control unit 210 transmits, to the power supply unit 140, the mode control signal for causing the second image forming apparatus 200 to shift into the shutdown mode S4 from any of the standby mode S1, the engine OFF mode S2 and the controller OFF mode S3. The power supply unit 140 that has received the mode control signal supplies electric power to each of the microcomputer 115, the RTC 116, the luminance sensor 117, the input device 118, and the first communication unit 150 among the elements constituting the second image forming apparatus 200 while stopping the supply of electric power to the other elements. If the shift into the shutdown mode S4 is completed, the power supply control unit 210 performs control so that a signal indicating the completion of the shift into the shutdown mode S4 is transmitted to the first image forming apparatus 100 (microcomputer 115) through the first communication unit 150 as a response to the first control signal.

Figure 8:
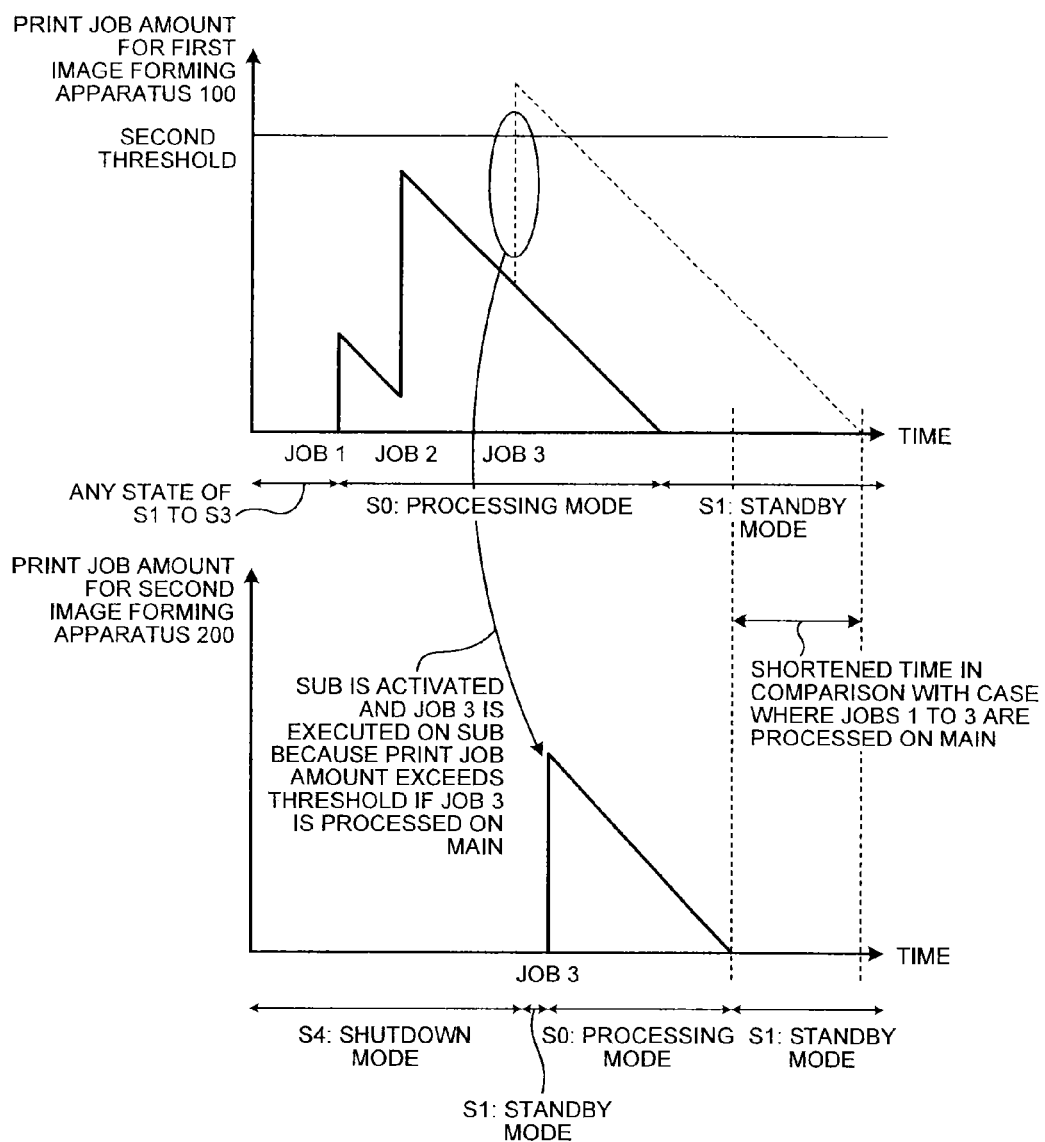
FIG. 8 includes graphs for explaining the case where three print jobs are transmitted to the first image forming apparatus when the second image forming apparatuses are in a shutdown mode.

As illustrated in FIG. 8, supposed is the case where three print jobs (job 1 to job 3) are transmitted to the first image forming apparatus 100 from the host apparatuses 300 continuously when the second image forming apparatuses 200 are in the shutdown mode S4. The horizontal axis in FIG. 8 indicates an elapsed time, and the longitudinal axis indicates a print job amount (the number of paper to be printed) that is accumulated in the image forming apparatus. When the print job amount accumulated in the first image forming apparatus 100 (second control unit 180) is larger than the second threshold, the first image forming apparatus 100 performs control so that the above-mentioned second control signal is transmitted to any of the second image forming apparatuses 200 through the first communication unit 150 and a part of the print job amount thereof is assigned to it.

In the example of FIG. 8, the processing of the job 2 has not been finished at a stage at which the first image forming apparatus 100 has received the job 3. In this case, if the job amount of the job 3 is processed by the first image forming apparatus 100, the accumulated job amount exceeds the predetermined second threshold. For this reason, the first image forming apparatus 100 (second control unit 180) performs control so that the above-mentioned second control signal is transmitted to the second image forming apparatuses 200 in the shutdown mode S4 through the first communication unit 150 at the stage at which the first image forming apparatus 100 has received the job 3. Then, when the first image forming apparatus 100 (second control unit 180) detects the reception, by the second communication unit 128, of a signal indicating that the shift into the standby mode S1 is completed from the second image forming apparatus 200 to which the second control signal has been transmitted, as the response to the second control signal, the first image forming apparatus 100 performs control so that the job 3 is assigned to the second image forming apparatus 200 through the network (through the second communication unit 128). This makes it possible to shorten a waiting time for the job completion in comparison with the case where the first image forming apparatus 100 processes the three print jobs (jobs 1 to 3).

A user can set the above-mentioned second threshold from the operating unit 110 in consideration of the waiting time and the energy saving effect. That is, the first image forming apparatus 100 may include a setting unit that sets the second threshold in accordance with an input (input by an operation on the input device 118 by the user). Furthermore, the setting unit can also have a function of setting the above-mentioned first threshold in accordance with an input. In summary, it is sufficient that the setting unit has a function of setting the first threshold or the second threshold. The functions of the setting unit may be executed when the CPU of the microcomputer 115 executes the programs stored in the ROM and the like or may be executed on a dedicated hardware circuit, for example.

As described above, in the embodiment, each of the main first image forming apparatus 100 and the sub second image forming apparatuses 200 includes the first communication unit 150 that does not use the network such as the Ethernet and is capable of communicating with other image forming apparatuses with a communication scheme of which power consumption is smaller than that with a communication scheme using the network. When the print job amount monitored by the monitoring unit 160 is equal to or smaller than the first threshold, the main first image forming apparatus 100 (first control unit 170) performs control so that the first control signal is transmitted to the second image forming apparatuses 200. The first control signal is a signal for causing the second image forming apparatuses 200 to shift into the shutdown mode S4 (first mode) in which supply of electric power to each of the printing units 132 and the second communication units 128 is stopped and electric power is supplied to the first communication unit 150. Then, when the second image forming apparatuses 200 are in the shutdown mode S4 and the print job amount for the first image forming apparatus 100 is larger than the second threshold, the main first image forming apparatus 100 (second control unit 180) performs control so that the second control signal is transmitted to the second image forming apparatuses 200 in the shutdown mode S4 through the first communication units 150. The second control signal is a signal for causing the second image forming apparatuses 200 to shift into the standby mode S1 (second mode) in which electric power is supplied to each of at least the printing units 132 and the second communication units 128.

That is, when each sub second image forming apparatus 200 is made to stand by, the first communication unit 150 that is capable of communicating with other image forming apparatuses with the communication scheme of which power consumption is smaller than that with the communication scheme using the network is activated and supply of electric power to the second communication unit 128 that communicates with other image forming apparatuses and the host apparatuses 300 with the communication scheme using the network is stopped. This makes it possible to reduce the power consumption in comparison with the case where each sub second image forming apparatus 200 is made to stand by in the state of being capable of responding to the network as in the conventional technique.

Furthermore, as described above, when the second image forming apparatuses 200 are in the shutdown mode S4 and the print job amount for the first image forming apparatus 100 is larger than the second threshold, the main first image forming apparatus 100 (second control unit 180) performs control so that a part of the print job amount for the first image forming apparatus 100 is assigned to the second image forming apparatus 200 to which the second control signal is transmitted. This makes it possible to reduce the power consumption and prevent the waiting time for the job completion from being delayed (prevent productivity from being lowered).

Second Embodiment

Figure 9:
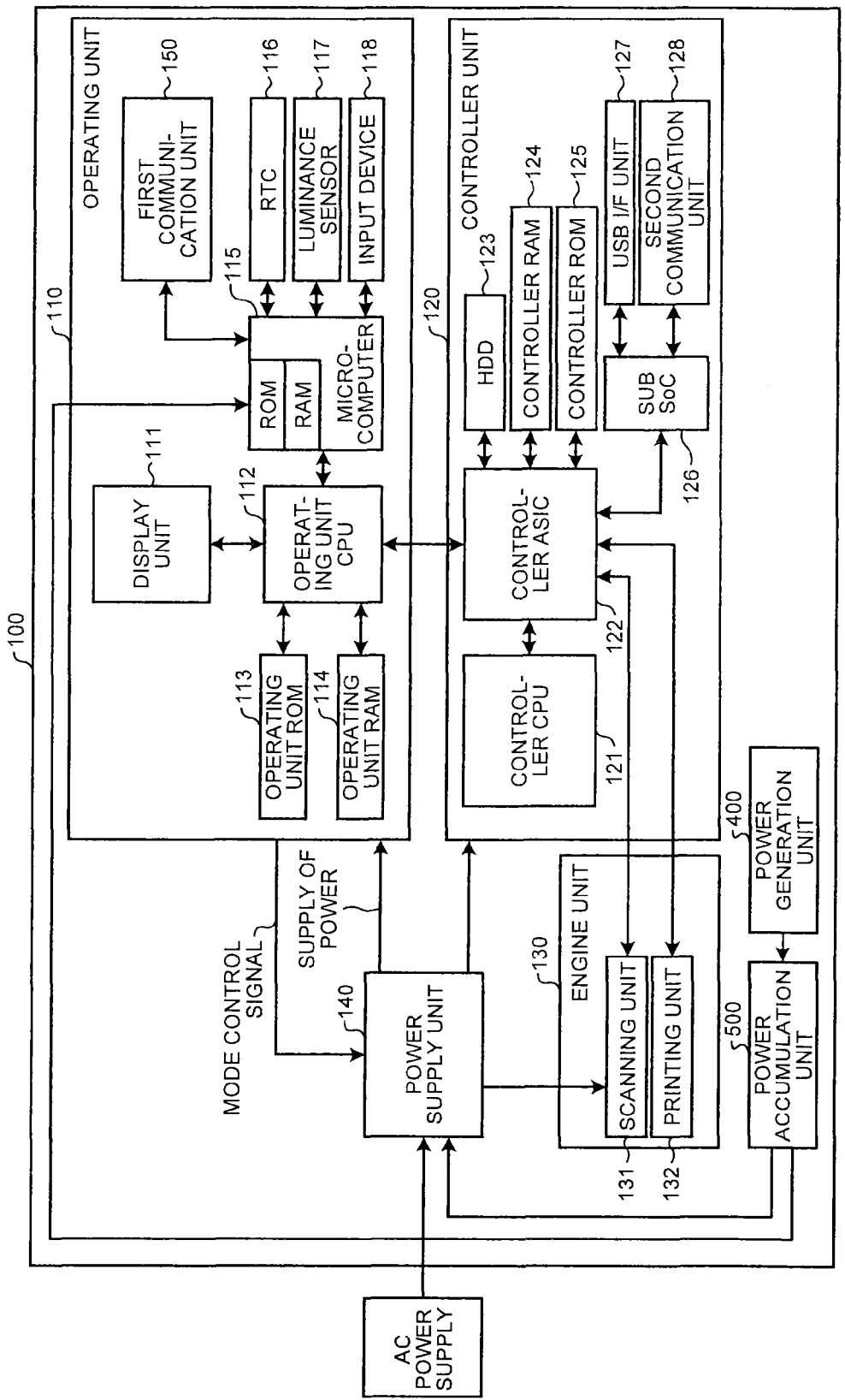
FIG. 9 is a diagram illustrating a hardware configuration example of a first image forming apparatus according to a second embodiment.

The following describes a second embodiment. The second embodiment is different from the above-mentioned first embodiment in a point that each of the image forming apparatuses (the first image forming apparatus 100 and the second image forming apparatuses 200) further includes a power generation unit 400 and a power accumulation unit 500 as illustrated in FIG. 9. Although FIG. 9 illustrates the configuration of the first image forming apparatus 100, the configurations of the second image forming apparatuses 200 are the same as that of the first image forming apparatus 100.

The power generation unit 400 is a device that generates electric power. The power generation unit 400 can be configured by a device that generates electric power from natural energy, such as a solar cell and a thermoelectric conversion element. The power accumulation unit 500 is a device that accumulates the electric power generated by the power generation unit 400. Although the power accumulation unit 500 may be configured by a secondary battery such as a lithium secondary battery and a nickel secondary battery, a capacitor, or the like, the power accumulation unit 500 is not limited thereto. The power supply unit 140 is capable of supplying the electric power accumulated in the power accumulation unit 500 to the respective parts of the image forming apparatus. The microcomputer 115 is capable of detecting a power accumulation amount of the power accumulation unit 500.

In the embodiment, when the second image forming apparatuses 200 are in the shutdown mode S4, the main first image forming apparatus 100 (second control unit 180) is capable of communicating with the microcomputers 115 of the second image forming apparatuses 200 in the shutdown mode S4 through the first communication unit 150 so as to monitor the power accumulation amounts of the power accumulation units 500 in the respective second image forming apparatuses 200. When the print job amount for the first image forming apparatus 100 is larger than the second threshold, the second control unit 180 in the embodiment determines the second image forming apparatus 200 to which the second control signal is to be transmitted, based on the power accumulation amounts of the power accumulation units 500 in the second image forming apparatuses 200 in the shutdown mode S4.

To be more specific, the second control unit 180 is capable of determining, as the second image forming apparatus 200 to which the second control signal is transmitted, the second image forming apparatus 200 in which the power accumulation amount of the power accumulation unit 500 is equal to or higher than a level at which the second image forming apparatus 200 can be activated even if it does not receive supply of electric power from the AC power supply among the second image forming apparatuses 200 in the shutdown mode S4. That is, there is an advantage that the use of the AC power supply can be suppressed as much as possible by recovering the second image forming apparatus 200 that can be preferentially activated even without using the AC power supply.

Third Embodiment

The following describes a third embodiment. Hardware configurations of image forming apparatuses (the first image forming apparatus 100 and the second image forming apparatuses 200) according to the third embodiment are the same as those in the second embodiment and explanation of portions common to those in the above-mentioned embodiments is omitted appropriately. FIG. 10 is a block diagram illustrating an example of functions of the first image forming apparatus 100 in the third embodiment. As illustrated in FIG. 10, the first image forming apparatus 100 further includes a power accumulation amount monitoring unit 185 and a threshold setting unit 190. Although the respective functions of the power accumulation amount monitoring unit 185 and the threshold setting unit 190 are executed when the microcomputer 115 executes the programs stored in the ROM and the like in this example, the embodiment is not limited thereto. For example, at least one function of the power accumulation amount monitoring unit 185 and the threshold setting unit 190 may be executed on a dedicated hardware circuit.

The power accumulation amount monitoring unit 185 monitors the power accumulation amount of the power accumulation unit 500 included in the first image forming apparatus 100. Furthermore, the power accumulation amount monitoring unit 185 monitors, through the first communication unit 150 or the second communication unit 128, the power accumulation amount of the power accumulation unit 500 included in each of the second image forming apparatuses 200.

The threshold setting unit 190 changes the above-mentioned second threshold based on the power accumulation amount (hereinafter, referred to as "power accumulation amount of the first image forming apparatus 100" in some cases) of the power accumulation unit 500 included in the first image forming apparatus 100 or the power accumulation amount (hereinafter, referred to as "power accumulation amount of the second image forming apparatus 200" in some cases) of the power accumulation unit 500 included in the second image forming apparatus 200. For example, when the power accumulation amount of the second image forming apparatus is equal to or larger than a third threshold, the threshold setting unit 190 is capable of decreasing the above-mentioned second threshold.

For example, patterns according to which the threshold setting unit 190 changes the second threshold can be also expressed as illustrated in FIG. 11. A pattern A in FIG. 11 indicates that the threshold setting unit 190 decreases the above-mentioned second threshold when the power accumulation amount of the first image forming apparatus 100 is equal to or larger than the third threshold and the power accumulation amount of the second image forming apparatus 200 is equal to or larger than the third threshold. Because the power accumulation amount of the second image forming apparatus 200 is sufficient in the case of the pattern A, the threshold setting unit 190 decreases the second threshold so as to use the second image forming apparatus 200 actively when the print jobs are intensively received.

A pattern B in FIG. 11 indicates that the threshold setting unit 190 does not change the above-mentioned second threshold when the power accumulation amount of the first image forming apparatus 100 is equal to or larger than the third threshold and the power accumulation amount of the second image forming apparatus 200 is smaller than the third threshold. The power accumulation amount of the second image forming apparatus 200 is not sufficient in the case of the pattern B, so that the threshold setting unit 190 does not change the second threshold to keep at a default value.

A pattern C in FIG. 11 indicates that the threshold setting unit 190 decreases the above-mentioned second threshold when the power accumulation amount of the first image forming apparatus 100 is smaller than the third threshold and the power accumulation amount of the second image forming apparatus 200 is equal to or larger than the third threshold. As in the pattern A, the power accumulation amount of the second image forming apparatus 200 is sufficient in the case of the pattern C, so that the threshold setting unit 190 decreases the second threshold so as to use the second image forming apparatuses 200 actively when the print jobs are intensively received.

A pattern D in FIG. 11 indicates that the threshold setting unit 190 does not change the above-mentioned second threshold when the power accumulation amount of the first image forming apparatus 100 is smaller than the third threshold and the power accumulation amount of the second image forming apparatus 200 is smaller than the third threshold. As in the pattern B, the power accumulation amount of the second image forming apparatus 200 is not sufficient in the case of the pattern D, so that the threshold setting unit 190 does not change the second threshold to keep at a default value.

Furthermore, the patterns according to which the threshold setting unit 190 changes the second threshold can be also expressed as in FIG. 12, for example. A pattern E in FIG. 12 indicates that the threshold setting unit 190 decreases the above-mentioned second threshold when the power accumulation amount of the first image forming apparatus 100 is equal to or larger than the third threshold and the power accumulation amount of the second image forming apparatus 200 is equal to or larger than the third threshold. The pattern E is the same as the pattern A in FIG. 11.

A pattern F in FIG. 12 indicates that the threshold setting unit 190 increases the above-mentioned second threshold when the power accumulation amount of the first image forming apparatus 100 is equal to or larger than the third threshold and the power accumulation amount of the second image forming apparatus 200 is smaller than the third threshold. The power accumulation amount of the second image forming apparatus 200 is not sufficient in the case of the pattern F but the power accumulation amount of the first image forming apparatus 100 is sufficient; therefore, as many print jobs as possible are processed on the first image forming apparatus 100 by increasing the second threshold.

A pattern G in FIG. 12 indicates that the threshold setting unit 190 sets the above-mentioned second threshold to 0 when the power accumulation amount of the first image forming apparatus 100 is smaller than the third threshold and the power accumulation amount of the second image forming apparatus 200 is equal to or larger than the third threshold. In the case of the pattern G, the AC power consumption can be reduced by processing the print jobs on the second image forming apparatus 200 in comparison with the case where the print jobs are processed on the first image forming apparatus 100, so that the second control unit 180 performs control so that all the print jobs are assigned to the second image forming apparatus 200.

A pattern H in FIG. 12 indicates that the threshold setting unit 190 does not change the above-mentioned second threshold when the power accumulation amount of the first image forming apparatus 100 is smaller than the third threshold and the power accumulation amount of the second image forming apparatus 200 is smaller than the third threshold. The pattern H is the same as the pattern D in FIG. 11.

The example in FIG. 12 illustrates the operations placing priority on power saving in comparison with the example illustrated in FIG. 11. The example illustrated in FIG. 11 is superior to the example illustrated in FIG. 12 in terms of productivity. The operation manner (changing manner of the second threshold) can be set variably based on the power accumulation amounts of the respective image forming apparatuses (the first image forming apparatus 100 and the second image forming apparatuses 200) in accordance with product specification and desire of customers. Furthermore, only one threshold (third threshold) is set as the threshold of the power accumulation amounts of the respective image forming apparatuses in the above-mentioned example. Alternatively, the plurality of thresholds of the power accumulation amounts can be also set. If the plurality of thresholds of the power accumulation amounts are set, the threshold values of the accumulated job amounts can be also controlled finely (change of the second threshold can be also controlled more finely).

Modification

Hereinbefore, the embodiments of the invention have been described. The invention is not limited to the above-mentioned embodiments and various modifications can be made in a range without departing from the scope of the invention.

For example, the main image forming apparatus and the sub image forming apparatuses may be selected (set variably) in accordance with usage conditions (print job amount, environmental luminance, and the like) of the respective image forming apparatuses. That is, any image forming apparatuses may be main or sub image forming apparatuses.

Control programs to be executed in the image forming apparatus (CPU of the microcomputer 115, and the like) in each of the above-mentioned embodiments may be configured to be provided by being recorded in a computer-readable recording medium, such as a compact disc read only memory (CD-ROM), a flexible disk (FD), a CD recordable (CD-R), or a digital versatile disk (DVD), in a format that can be installed or a file that can be executed. The control programs to be executed in the image forming apparatus in each of the above-mentioned embodiments may be configured to be provided by being stored on a computer connected to the network such as the Internet and being downloaded through the network. Alternatively, the control programs to be executed in the image forming apparatus in each of the above-mentioned embodiments may be provided or distributed through the network such as the Internet.

The present invention can provide an advantageous effect of further reducing power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system comprising:
   a first image forming apparatus and a second image forming apparatus that are capable of being connected to each other through a network, wherein
   the second image forming apparatus includes:
      a first communication unit configured to communicate with the first image forming apparatus with a communication scheme that does not use the network and of which power consumption is smaller than power consumption of a communication scheme using the network;
      a second communication unit configured to communicate with each of a host apparatus and the first image forming apparatus through the network, and
      a first printing unit configured to perform printing in accordance with a print job from the host apparatus, and
   the first image forming apparatus includes:
      a third communication unit configured to communicate with the second image forming apparatus with a communication scheme that does not use the network and of which power consumption is smaller than power consumption of a communication scheme using the network;
      a fourth communication unit configured to communicate with each of the host apparatus and the second image forming apparatus through the network;
      a second printing unit configured to perform printing in accordance with the print job;
      a monitoring unit configured to monitor a print job amount indicating an amount of the print job;
      a first control unit configured to, when the print job amount monitored by the monitoring unit is equal to or smaller than a first threshold, perform control so that a first control signal is transmitted to the second image forming apparatus through the third communication unit or the fourth communication unit, the first control signal being a signal for causing the second image forming apparatus to shift into a first mode in which electric power is supplied to the first communication unit while stopping supply of electric power to each of the first printing unit and the second communication unit; and
      a second control unit configured to, when the second image forming apparatus is in the first mode and the print job amount for the first image forming apparatus is larger than a second threshold, perform control so that a second control signal is transmitted to the second image forming apparatus through the third communication unit, the second control signal being a signal for causing the second image forming apparatus to shift into a second mode in which electric power is supplied to each of the first printing unit and the second communication unit.

2. The image forming system according to claim 1, wherein the second control unit performs control so that at least a part of the print job amount for the first image forming apparatus is assigned to the second image forming apparatus to which the second control signal is transmitted.

3. The image forming system according to claim 1, wherein the second image forming apparatus further includes a power supply control unit configured to:
   when the first communication unit has received the second control signal, perform control so that electric power is supplied to each of the first printing unit and the second communication unit while stopping supply of electric power to the first communication unit; and
   when the second communication unit has received the first control signal, perform control so that electric power is supplied to the first communication unit while stopping supply of electric power to each of the first printing unit and the second communication unit.

4. The image forming system according to claim 1, wherein two or more second image forming apparatuses are provided,
   each of the second image forming apparatuses further includes:
      a power generation unit configured to generate electric power, and
      a power accumulation unit configured to accumulate electric power generated by the power generation unit, and
   when the second image forming apparatuses are in the first mode and the print job amount for the first image forming apparatus is larger than the second threshold, the second control unit determines the second image forming apparatus to which the second control signal is to be transmitted, based on power accumulation amounts of the power accumulation units of the respective second image forming apparatuses.

5. The image forming system according to claim 1, further comprising a setting unit configured to set the first threshold or the second threshold in accordance with an input.

6. The image forming system according to claim 1, wherein each of the first image forming apparatus and the second image forming apparatus further includes;
   a power generation unit configured to generate electric power, and
   a power accumulation unit configured to accumulate electric power generated by the power generation unit, and
the first image forming apparatus further includes a threshold setting unit configured to change the second threshold in accordance with a power accumulation amount of the power accumulation unit of the first image forming apparatus or a power accumulation amount of the power accumulation unit of the second image forming apparatus.

7. The image forming system according to claim 6, wherein the threshold setting unit decreases the second threshold when the power accumulation amount of the power accumulation unit of the second image forming apparatus is equal to or larger than a third threshold.

8. The image forming system according to claim 1, wherein the second communication unit and the fourth communication unit make communication using ZigBee.

9. The image forming system according to claim 1, wherein the second communication unit and the fourth communication unit make communication using BlueTooth.

10. The image forming system according to claim 1, wherein the second communication unit and the fourth communication unit make communication with wires.

11. The image forming system according to claim 1, wherein the second communication unit and the fourth communication unit make communication using infrared rays.

12. A first image forming apparatus that is capable of connecting to each of a host apparatus and a second image forming apparatus through a network, the second image forming apparatus including a first communication unit configured to communicate with the first image forming apparatus with a communication scheme that does not use the network and of which power consumption is smaller than power consumption of a communication scheme using the network; a second communication unit configured to communicate with each of a host apparatus and the first image forming apparatus through the network; and a first printing unit configured to perform printing in accordance with a print job from the host apparatus,
   the first image forming apparatus comprising:
   a third communication unit configured to communicate with the second image forming apparatus with a communication scheme that does not use the network and of which power consumption is smaller than power consumption of a communication scheme using the network;
   a fourth communication unit configured to communicate with each of the host apparatus and the second image forming apparatus through the network;
   a second printing unit configured to perform printing in accordance with a print job from the host apparatus;
   a monitoring unit configured to monitor a print job amount indicating an amount of the print job;
   a first control unit configured to, when the print job amount monitored by the monitoring unit is equal to or smaller than a first threshold, perform control so that a first control signal is transmitted to the second image forming apparatus through the third communication unit or the fourth communication unit, the first control signal being a signal for causing the second image forming apparatus to shift into a first mode in which electric power is supplied to the first communication unit of the second image forming apparatus while stopping supply of electric power to each of the first printing unit and the second communication unit of the second image forming apparatus; and
   a second control unit configured to, when the second image forming apparatus is in the first mode and the print job amount for the first image forming apparatus is larger than a second threshold, perform control so that a second control signal is transmitted to the second image forming apparatus through the third communication unit, the second control signal being a signal for causing the second image forming apparatus to shift into a second mode in which electric power is supplied to each of the first printing unit and the second communication unit of the second image forming apparatus.

\* \* \* \* \*